UNITED STATES PATENT OFFICE.

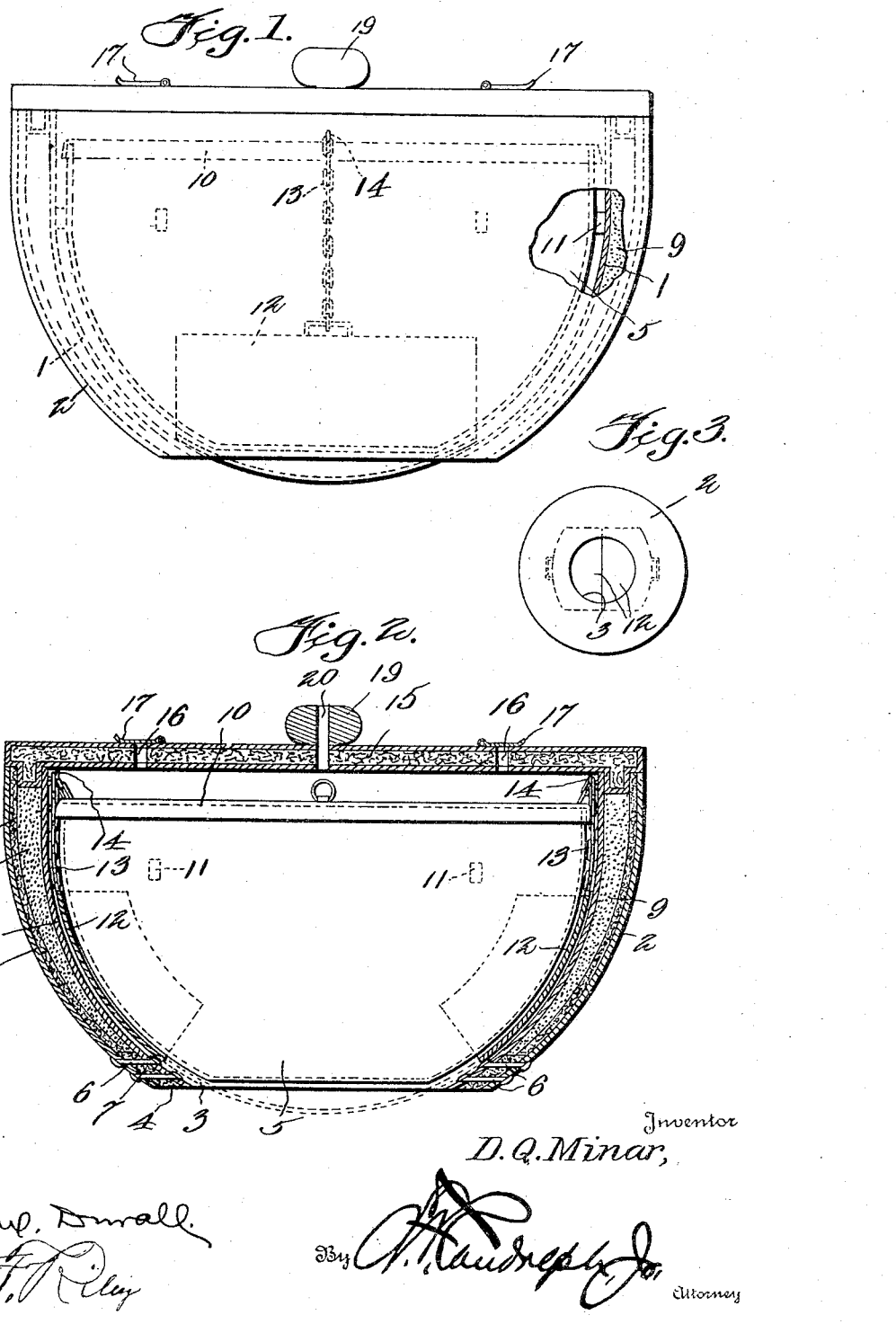

DAVID Q. MINAR, OF UPLAND, CALIFORNIA.

FIRELESS COOKING UTENSIL.

1,205,919. Specification of Letters Patent. Patented Nov. 21, 1916.

Application filed November 23, 1915. Serial No. 63,015.

*To all whom it may concern:*

Be it known that I, DAVID Q. MINAR, a citizen of the United States, residing at Upland, in the county of San Bernardino and State of California, have invented certain new and useful Improvements in Fireless Cooking Utensils; and I do hereby declare the following to be a full, clear, and exact description of the invention, such as will enable others skilled in the art to which it appertains to make and use the same.

The invention relates to a fireless cooking utensil.

The object of the present invention is to provide a simple, practical and comparatively inexpensive fireless cooking utensil adapted to contain an article or articles of food to be cooked and equipped with means for permitting a flame and heat from a burner or fire to pass around an inner receptacle for such article or articles of food and adapted after the same has been heated to the required degree for starting the cooking to be closed to confine the heat within it so that it will operate as a fireless cooker during the remainder of the cooking operation.

A further object of the invention is to provide a fireless cooking utensil of this character adapted to reduce to a minimum the consumption of fuel and capable of easy operation.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a side elevation of a fireless cooking utensil constructed in accordance with this invention, a portion of the inner and outer shells or kettles being broken away to show the sliding gate, Fig. 2 is a vertical sectional view of the same. Fig. 3 is a reverse plan view of the fireless cooking utensil on a reduced scale.

Like numerals of reference designate corresponding parts in the several figures of the drawing.

In the accompanying drawing in which is illustrated the preferred embodiment of the invention the fireless cooking utensil which is in the form of a kettle comprises in its construction inner and outer shells 1 and 2 of approximately semi-spherical form preferably constructed of cast metal and adapted to form a kettle-shaped body of the required size. The shells 1 and 2 which are provided with openings 3 and 4 in their bottoms to permit the flame and heat from a burner or fire to pass upwardly and impinge against an inner cooking utensil 5 are secured together around the fire openings 3 and 4 by rivets 6, a packing 7 of asbestos or other suitable material being interposed between the inner and outer shells at the said openings 3 and 4.

The packing spaces the inner and outer shells and prevents loss or escape of insulating and heat retaining material which is arranged in the space between the inner and outer shells in the form of a packing. This material preferably consists of a lining 8 of asbestos and a filling or packing 9 of comminuted soap stone or similar material. By this construction the heat is retained within the device after the burner has been put out or the device removed therefrom, the device being adapted for use over various stoves and heaters.

The fire openings are preferably five or six inches in diameter but may be made of any desired size to suit the size of the fireless cooking utensil and in practice when the latter is placed over a stove or heater, the heat and other products of combustion pass upward through the openings 3 and 4 around the exterior of the inner cooking utensil 5 which is preferably constructed of aluminum and provided with an aluminum cover 10. The inner aluminum cooking utensil is arranged in spaced relation with the inner shell 1, being spaced therefrom by means of lugs 11 to provide a passage for the products of combustion and also for a pair of curved slidable gates 12 adapted to be maintained in an elevated position by chains 13 or other suitable means while the device is being heated to start the cooking and capable also of being lowered from the elevated position illustrated in full lines in Fig. 2 of the drawings to the dotted line position shown in the said figure to cover the bottom openings 3 and 4 and assist in confining the heat within the utensil.

The slides which are guided by the lugs 11 are curved longitudinally and transversely to conform to the configuration of the inner shell 1 and when they are in their lower or closed position they meet at the center. Any other suitable means may of course be employed for closing the fire openings 3 and 4. The sliding gates preferably consist of heavy cast metal but they may be constructed of any other suitable material and may be insulated with non-heat conducting and retaining material. The inner shell 1 is provided with hook shaped projections 14 arranged to be engaged by the links of the chains 13 for supporting the sliding gates.

The fireless cooking utensil is equipped with a main insulated cover 15 having draft openings 16 and equipped with suitable closures 17 for covering the draft openings after the operation of preliminarily heating the device has been completed. The closures 17 are preferably pivoted but any other suitable means may of course be provided for covering the draft openings of the main cover of the fireless cooking utensil. The fireless cooking utensil may be constructed of various sizes and it is adapted for cooking separate articles of food and adapted to reduce to a minimum the consumption of fuel.

The main insulating cover is provided at its periphery with a flange which when the cover 15 is in position fits between the inner and outer shells and rests against the interposed packing 9. The cover is also provided with a central handle 19 having a central opening which extends through the cover and constitutes a central draft opening for permitting a uniform flow of heat around the cooking utensil. The fireless cooker may be provided with supporting legs to enable it to be arranged upon a stove or other heating device in spaced relation with the same.

What is claimed is:—

1. A fireless cooking utensil comprising inner and outer shells arranged in spaced relation and provided with bottom openings, insulating material arranged in the space between the shells for retaining heat within the devices, said shells and insulating material constituting a substantially kettle shaped body adapted to be placed upon a stove or heater, an inner removable cooking utensil arranged within the inner shell, a cover for the inner and outer shells and means for covering the bottom opening without removing the said body from the stove or heater.

2. A fireless cooking utensil comprising inner and outer shells arranged in spaced relation and provided with bottom openings, insulating material arranged in the space between the shells for retaining heat within the devices, said shells and insulating material constituting a substantially kettle shaped body adapted to be placed on a stove or heater, an inner removable cooking utensil arranged within the inner shell, a cover for the inner and outer shells, slidable gates or closures for the bottom opening, and means for operating the gases or closures without removing the body from a stove or heater.

3. A fireless cooking utensil comprising inner and outer shells arranged in spaced relation and provided with bottom openings, insulating material arranged in the space between the shells for retaining heat within the devices, an inner removable cooking utensil arranged within the inner shell, a cover for the inner and outer shells and slidable gates or closures for the bottom opening, said gates or closures operating between the inner shell and the inner cooking utensil.

4. A fireless cooking utensil comprising inner and outer shells arranged in spaced relation and provided with bottom openings, insulating material arranged in the space between the shells for retaining heat within the devices, said shells and insulating material forming a substantially kettle shaped body adapted to be placed upon a stove or heater, an inner removable cooking utensil arranged within the inner shell, a cover for the inner and outer shells, slidable gates or closures for covering and uncovering the bottom opening, and operating means connected with the gates or closures and adapted to support the same in an elevated position and capable also of closing the gates or closures without removing the said body from the stove or heater.

5. A fireless cooking utensil having a bottom opening and provided with a cover, an inner removable vessel or utensil arranged in spaced relation with the fireless cooker, sliding gates operating between the fireless cooker and the inner removable receptacle or vessel and means for holding the same in an open position.

6. A fireless cooking utensil comprising a body having an opening in the bottom and provided with insulating material, said body being adapted to be placed upon a stove or heater, a removable inner utensil arranged in spaced relation with the body to permit heat and products of combustion to pass upward around it, a closure for the bottom opening, means for operating the closure without removing the body from the stove or heater, and a cover for the said body.

7. A fireless cooking utensil comprising inner and outer shells arranged in spaced relation and provided with bottom openings, an annular packing ring interposed between the inner and outer shells at the bottom opening, fastening means piercing the inner and outer shells and the packing ring and uniting the same to form a substantially kettle shaped body adapted to be placed on a stove or heater, insulating and heat retaining material arranged in the space between the shells, an inner removable cooking utensil, a cover for the inner and outer shells and a closure for the bottom openings of the shells having means for operating it without removing the body from a stove or heater.

In testimony whereof I affix my signature in presence of two witnesses.

DAVID Q. MINAR.

Witnesses:
C. K. CHADWICK,
HAZEL WRIGHT.

Copies of this patent may be obtained for five cents each, by addressing the "Commissioner of Patents, Washington, D. C."